US010825351B2

(12) United States Patent
Grande

(10) Patent No.: US 10,825,351 B2
(45) Date of Patent: Nov. 3, 2020

(54) VIRTUAL MUSIC LESSON SYSTEM AND METHOD OF USE

(71) Applicant: Michael Grande, Marlboro, NJ (US)

(72) Inventor: Michael Grande, Marlboro, NJ (US)

(*) Notice: Subject to any disclaimer, the term of this patent is extended or adjusted under 35 U.S.C. 154(b) by 0 days.

(21) Appl. No.: 16/169,252

(22) Filed: Oct. 24, 2018

(65) Prior Publication Data

US 2020/0135043 A1 Apr. 30, 2020

(51) Int. Cl.
*G09B 15/00* (2006.01)
*G10H 1/00* (2006.01)
*G09B 5/06* (2006.01)
*G10H 1/44* (2006.01)

(52) U.S. Cl.
CPC ............ *G09B 15/00* (2013.01); *G09B 5/065* (2013.01); *G10H 1/0033* (2013.01); *G10H 1/44* (2013.01)

(58) Field of Classification Search
CPC . G09B 5/04; G09B 5/06; G09B 15/00; G10H 2240/175; G10H 1/0033; G10H 1/0066; G10H 2240/131; G10H 2240/056; G10H 2240/311; G10H 2240/325; G10H 1/365; G10H 1/366; G10H 2220/041; H04W 88/02
See application file for complete search history.

(56) References Cited

U.S. PATENT DOCUMENTS

| | | | | |
|---|---|---|---|---|
| 6,751,439 B2* | 6/2004 | Tice | ............... | G09B 15/00 434/307 R |
| 9,373,313 B2* | 6/2016 | Chapman | ............ | G10H 1/0058 |
| 2002/0004191 A1* | 1/2002 | Tice | ............... | G09B 15/00 434/350 |
| 2005/0056141 A1* | 3/2005 | Uehara | ............... | G10H 1/0066 84/645 |
| 2005/0117569 A1* | 6/2005 | Aoyagi | ............. | H04L 29/06027 370/352 |
| 2005/0150362 A1* | 7/2005 | Uehara | ................. | G09B 15/00 84/645 |
| 2006/0283310 A1* | 12/2006 | Bicker | ................ | G10H 1/0066 84/645 |
| 2008/0163747 A1* | 7/2008 | Uehara | ............... | G10H 1/0058 84/645 |
| 2011/0146476 A1* | 6/2011 | Zimmerman | ......... | G09B 15/00 84/470 R |
| 2014/0033900 A1* | 2/2014 | Chapman | ............ | G10H 1/0083 84/609 |
| 2014/0096667 A1* | 4/2014 | Chapman | ............ | G10H 1/0058 84/609 |
| 2018/0174559 A1* | 6/2018 | Elson | ..................... | H04N 7/142 |

* cited by examiner

*Primary Examiner* — Marlon T Fletcher
(74) *Attorney, Agent, or Firm* — Pryor Cashman LLP

(57) ABSTRACT

A virtual music lesson application having a plurality of audio drivers to receive instrumental and vocal audio inputs and outputs, a low-latency audio mixer to mix the instrumental and vocal audio inputs and outputs, and a user interface having a student portal and a teacher portal, allowing a student and a teacher in remote locations to participate in an integrated music lesson.

23 Claims, 4 Drawing Sheets

VIRTUAL MUSIC LESSON SYSTEM AND METHOD OF USE

BACKGROUND

1. Field of the Invention

The present invention relates generally to a virtual music lesson system and methods of use. More specifically, the invention is related to a system and method to teach music lessons to students remotely via the Internet.

2. Description of Related Art

Systems and methods for teaching music lessons is well known in the art. For example, many local music stores and music studios offer music lessons for a variety of instruments including voice, piano, guitar and other instruments. Alternatively, many individuals provide private music lessons and the student must travel to the teacher's home or the teacher must travel to the student's home. In either case, the student or the teacher must have in their home the desired instrument or one of them must bring the instrument with them.

One of the problems commonly associated with standard systems and methods for music lesson is the limited use. If the desired instrument is a very large or obtuse size, it can be very inconvenient to transport the instrument to another location. Oftentimes, these instruments are very expensive as well and increase risk of damage may come with increased travel. In many cases, the student or teacher may not be able to travel to another location at all. In these cases, Skype or other Online video chat providers have been used for music lessons. However, it only allows one input, a microphone to speak and one output, an audio output from the other side of the connection. Additionally, it does not allow a second audio engine to play simultaneously with the audio input.

Although great strides have been made in the area of music lesson systems and methods of use, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
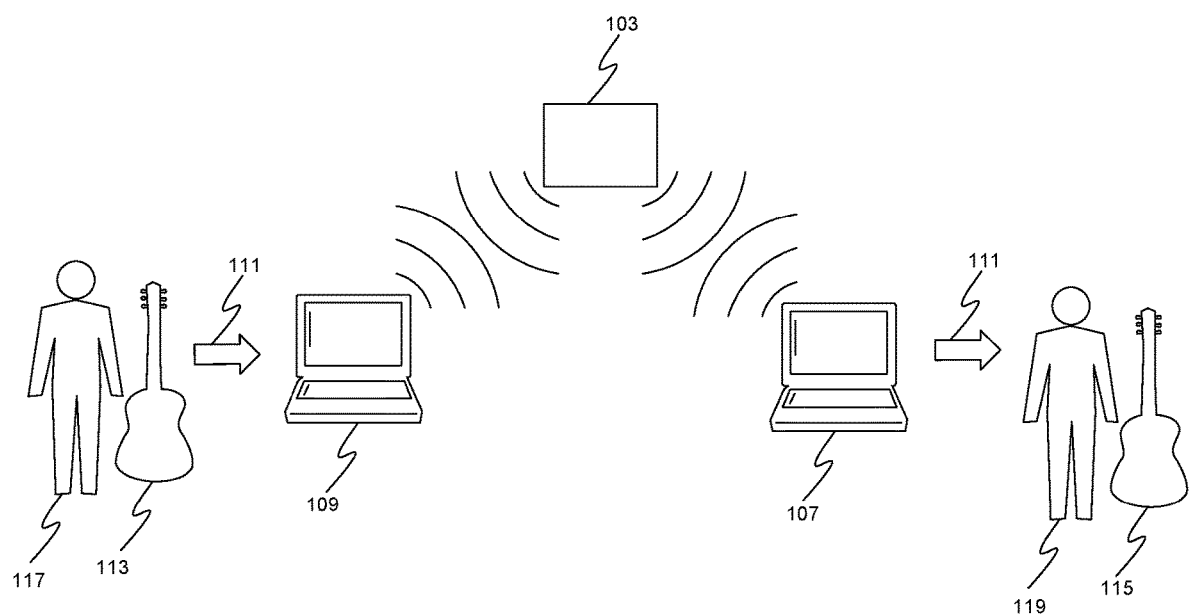
FIG. 1 is a simplified schematic of a system and method of the present invention in accordance with the preferred embodiment of the present invention.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional systems and methods to teach and receive music lessons. Specifically, the present invention is directed to an Online application that allows for video connection between a student and teacher with real time integration of the desired sheet music, tablature and chord charts. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

Figure 2:
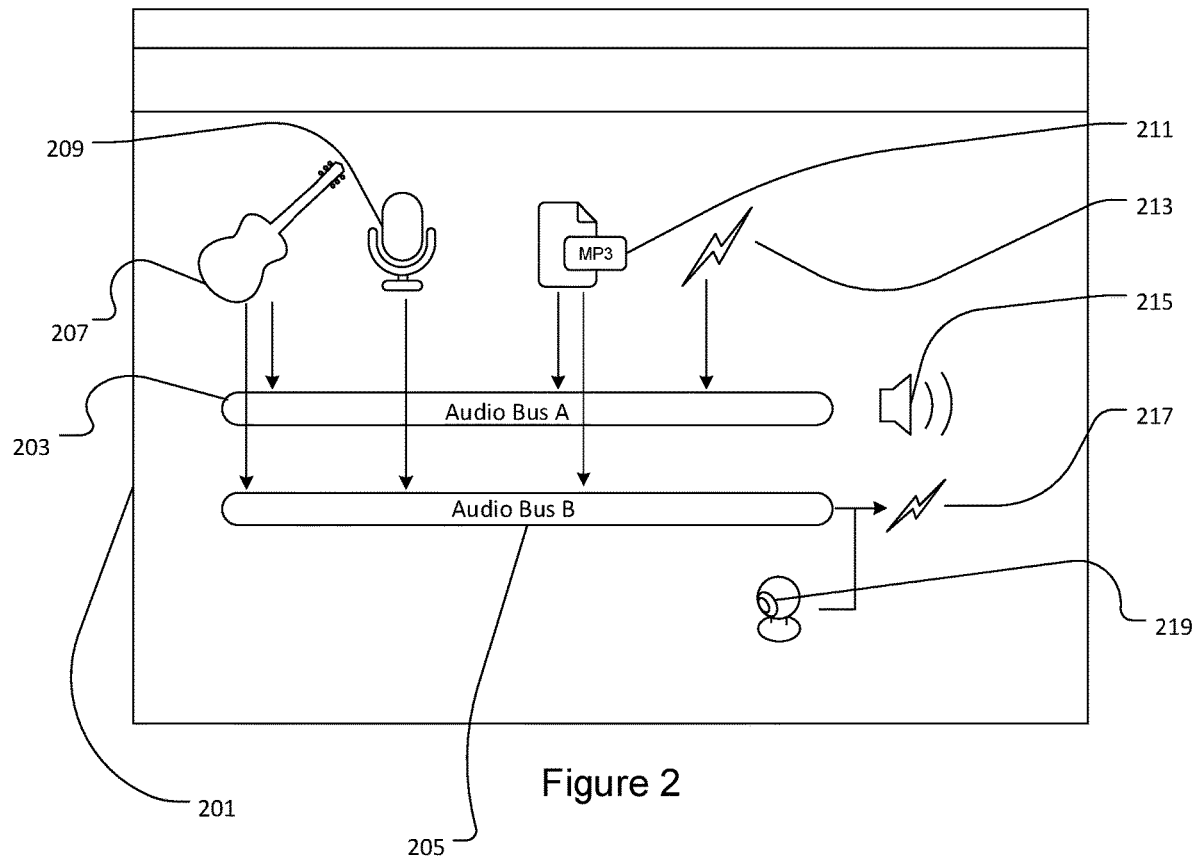
FIG. 2 is an alternate view of a system and method of the present invention.

Referring now to the drawings wherein like reference characters identify corresponding or similar elements throughout the several views, FIGS. 1-2 depict various views of a system 101 and method of use in accordance with a preferred embodiment of the present application. It will be appreciated that system 101 overcomes one or more of the above-listed problems commonly associated with the conventional systems and methods to teach and receive music lessons.

Referring now to FIG. 1, a simplified schematic of the system of the present invention is shown having a student 117, a teacher 119, a student's laptop or other electronic device 109, a teacher's laptop or other electronic device 107, an online application or software 103, a network connection 105 between the student's device, the teacher's device and the Online application. The system 101 is also shown having a student's instrument 113 connected to the student's device 109 via a connection device 111 such as a cable and a teacher's instrument 115 connected to a teacher's device 107 via a connection device 111 such as a cable.

Figure 5:
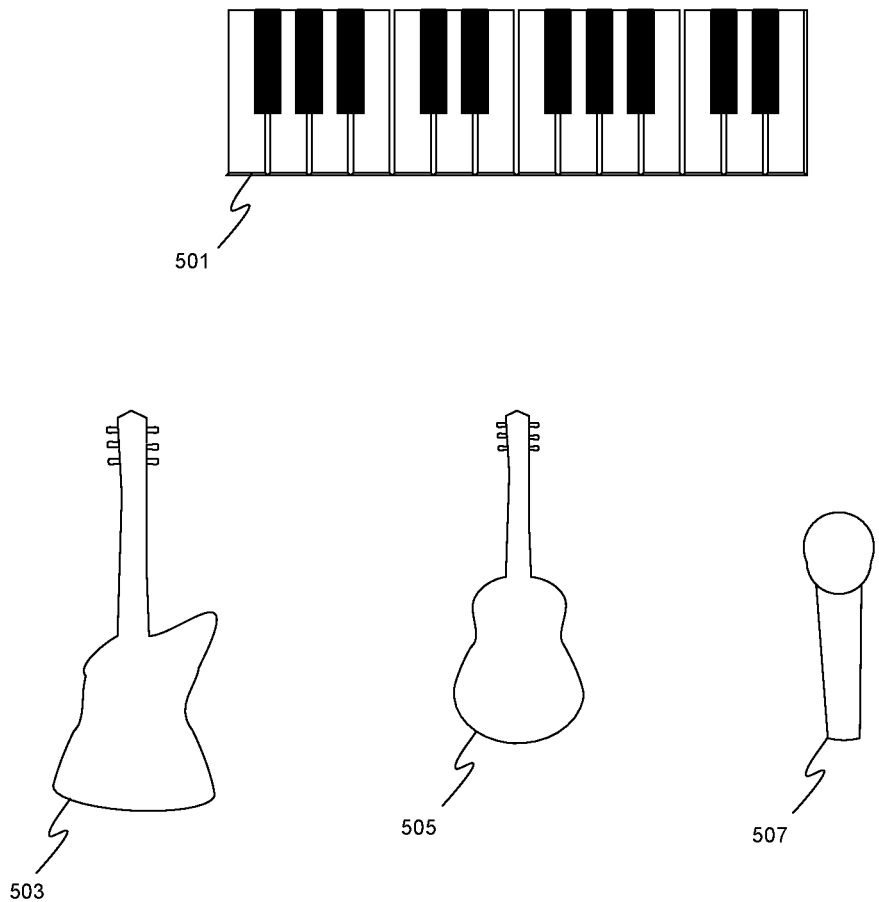
FIG. 5 is simplified schematic of several embodiments of the instrument of the system of FIG. 1.

In FIG. 1, the instruments 113, 115 are depicted as guitars as an example of an instrument. It is anticipated that the student's instrument 113 and teacher's instrument 115 may be any instrument, including but not limited to a guitar, pianos and keyboards, drums and other percussive instruments, violins and any other string instrument, a microphone for voice or another suitable instrument. FIG. 5 shows several embodiments of the instruments that may be used in the music lesson system including but not limited to a piano or keyboard 501, a bass guitar 503, a guitar 505, or a microphone 507.

Referring now to FIG. 2, an simplified schematic of the present invention as an audio routing system 201 is shown having an audio bus A 203 and an audio bus B 205. An instrument 207 is connected to both audio bus A 203 and B 205 while a voice input 209 is connected to audio bus B 205. An audio track 211 or beat configured as an MP3 file is connected to audio bus A 203 and audio bus B 205. Local audio speakers 215 or headphones are connected to audio bus A 203. A webcamera video 219 and MediaStream 217 via the internet is connected to audio bus B 205. System 201 also is shown having a REMOTE audio source 213 that can be connected into the session.

In FIG. 2, the instrument 207 is depicted as a guitar as an example of an instrument. However, it is anticipated that the instrument 207 may be any instrument, including but not limited to a guitar, pianos and keyboards, drums and other percussive instruments, violins and any other string instrument, a microphone for voice, or other instrument.

Figure 3:
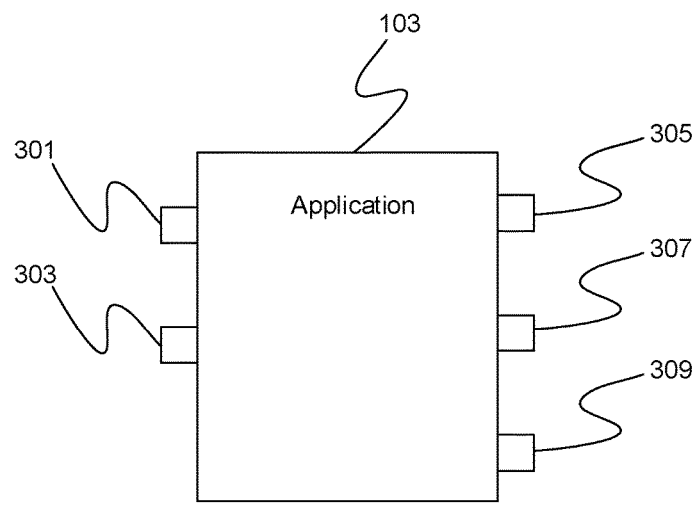
FIGS. 3-4 are simplified schematics of the application of system 101 of FIG. 1.

Referring now to FIG. 3, the application 103 is shown having a plurality of ports, including a music instrument in port 301, a voice in port 303, a speaker out port 305, a beat out port 307 and an opponent out port 309.

Figure 4:
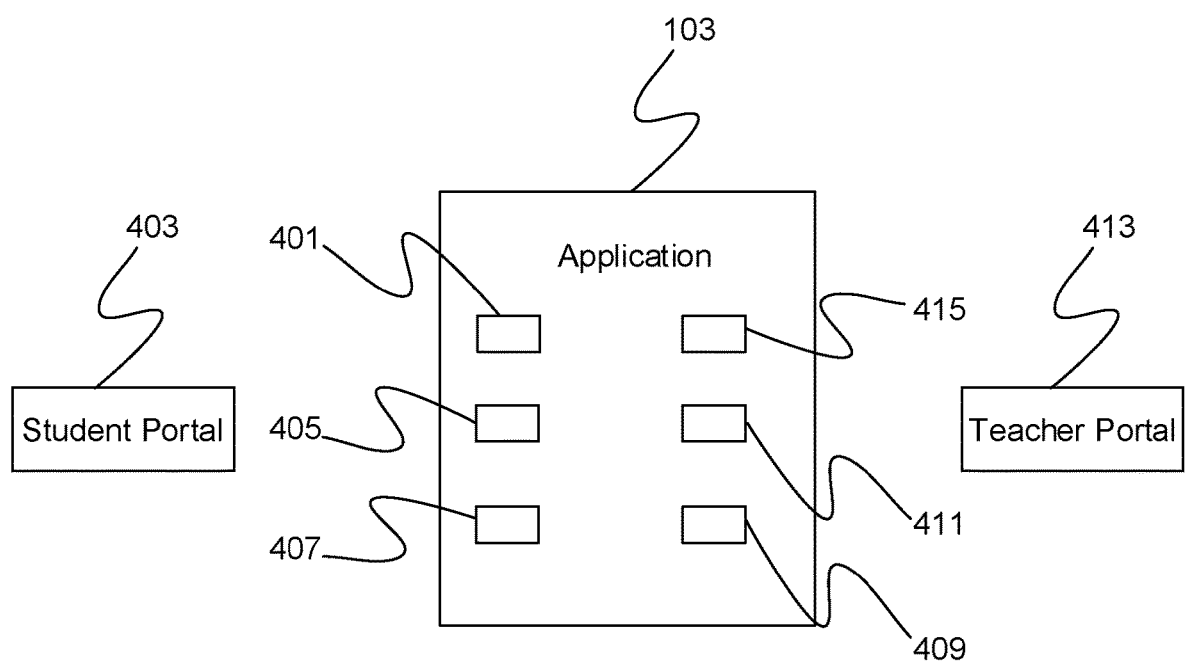

Referring now to FIG. 4, the application 103 is shown having a plurality of functions and features including audio drivers 401, a user interface 415, a student portal 403, a teacher portal 413, an updatable and downloadable library of audio backing tracks 411, a tuner 409, an audio-visual recorder 407, and an updatable and downloadable library of notes 405.

The application 103 utilizes a new audio mixing schema, allowing a student 117 and a teacher 119 to mix their voice and their instrument so the teacher and the student can hear each side with no audio loop or feedback. It is essential for a musician to clearly hear their instrument with a minimum delay, the application may be configured to use a Virtual Mixer (VoiceMeeter Banana) as a low-latency mixer for Windows OS. This allows the teacher and the student in separate, remote locations, as if they were in the same room. The present invention allows the ability to play over audio simultaneously in real time. The application 103 integrates streaming video, downloadable chords and musical notation, recording the entire audio lesson in real time and backing tracks in one interface. The only third-party apparatus required is a USB cable and the desired instrument.

The present invention is configured to have multiple audio inputs simultaneously, the ability to have background music or backing tracks as a separate input and the ability to adjust the volume between other inputs, the ability to remotely share and play audio tracks during the session. Sheet music, tabs and chords may be sent from the teacher to the student in real time based on chords or songs the student is learning. The student may download to his or her local machine different sets of chords and notes to be able to access them offline.

In an alternate embodiment, MIDI implementation may be integrated into the application to support any suitable MIDI device. The addition of the MIDI integration will allow a use to add a piano or keyboard to the application. The contemplated design will allow the piano or keyboard keys to light up or display on the student end portal when the teacher plays on his or her instrument. In similar fashion, the piano or keyboard keys will light up for the teacher when the student plays.

In addition, the application may include a library of special effects including but not limited to distortion, chorus, and reverb. In a further embodiment, the application may be configured to have teacher and student rooms. This technology may be licensed to teachers and students. Licenses may be managed in a centralized location where a teacher may join a student in a virtual teaching room.

The present invention offers the ability for students and teachers of music to come together from all over the world where there is Internet access. Teachers may also more easily teach those who are handicapped, disabled or unable to leave their homes. The application may be used by professional musicians, as a supplemental music tool for music schools, and independent music teachers.

Network connectivity relies on WEBRTC programming in order to set up a peer to peer connection. The network may also be configured to utilize UDP protocol to achieve minimum latency. To further reduce latency, the application utilizes low-latency ASIO audio drivers. It is contemplated that the media connection may be encrypted with end to end encryption using a DTLS algorithm. A signaling server may use a p2p connection secured with SSL TLS.

In one contemplated embodiment, the application 103 may be written in TypeScript using Aurelia framework, which may then be translated to JavaScript and executed using Electron.js application framework. In a further embodiment, the application may use Webkit WEBRTC API implementation but executed as a standalone application.

In another contemplated embodiment, the application 103 may be configured to have two main audio inputs from the ADC of a sound card, for example, a microphone and an instrument. The latter may have a soundcard in it and may be configured to have both a USB and audio jack connection to an onboard sound card.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A virtual music lesson system, comprising:
    a student computer associated with a student;
    a teacher computer associated with a teacher, the teacher computer remote from the student computer;
    an application in wireless communication with both the student computer and the teacher computer, having:
        a plurality of audio drivers configured to receive instrumental and vocal audio inputs and outputs;
        a low-latency audio mixer configured to mix the instrumental and vocal audio inputs and outputs;
        a user interface having a student portal and a teacher portal, the student portal configured to communicate with the student computer, and the teacher portal configured to communicate with the teacher computer;
an updatable and downloadable library of notes taken before, during or after a music lesson;
an audio-visual recorder whereby the student or the teacher records a lesson in real-time and has the ability to access the lesson at a later time, and
a library of audio backing tracks wherein the teacher is capable of playing background music in real-time during a music lesson,
wherein the student and the teacher at remote locations participate in an integrated music lesson by connecting an instrument to the student computer and the teacher computer via an analog to USB cable directly into a USB port on the student computer and the teacher computer; and
wherein the teacher communicates with the student via the application.

2. The virtual music lesson system of claim 1, wherein the application further comprises an electronic tuner configured to assist in the tuning of a plurality of instruments.

3. The virtual music lesson system of claim 1, wherein the updatable and downloadable library of notes includes chord charts or other information.

4. The virtual music lesson system of claim 1, wherein the application further comprises a library of special effects including one or more of distortion, chorus, and reverb.

5. The virtual music lesson system of claim 1, wherein the audio inputs and outputs further comprise:
a music instrument input;
a voice input;
a speaker output;
a beat output; and
an opponent output.

6. The virtual music lesson system of claim 1, wherein the application further comprises a WEBRTC programming interface configured to be able to set up a peer-to-peer connection.

7. The virtual music lesson system of claim 1, wherein the instrument is a guitar, bass guitar, keyboard, or microphone.

8. The virtual music lesson system of claim 1, wherein the application, the student computer, and the teacher computer are connected via a network connection.

9. The virtual music lesson system of claim 8, wherein the network connection is configured to use UDP and/or TCP protocol and is encrypted using end to end encryption.

10. A virtual music lesson system, comprising:
a student computer associated with a student;
a teacher computer associated with a teacher, the teacher computer remote from the student computer;
an application in wireless communication with both the student computer and the teacher computer, having:
a plurality of audio drivers configured to receive instrumental and vocal audio inputs and outputs;
a low-latency audio mixer configured to mix the instrumental and vocal audio inputs and outputs;
a user interface having a student portal and a teacher portal, the student portal configured to communicate with the student computer, and the teacher portal configured to communicate with the teacher computer; and
a library of audio backing tracks wherein the teacher is capable of playing background music in real-time during a music lesson,
wherein the student and the teacher at remote locations participate in an integrated music lesson by connecting an instrument to the student computer and the teacher computer via an analog to USB cable directly into a USB port on the student computer and the teacher computer; and
wherein the teacher communicates with the student via the application.

11. The virtual music lesson system of claim 10, wherein the application further comprises an electronic tuner configured to assist in the tuning of a plurality of instruments.

12. The virtual music lesson system of claim 10, wherein the application further comprises an updatable and downloadable library of notes taken before, during or after a music lesson, wherein the notes include chord charts or other information.

13. The virtual music lesson system of claim 10, wherein the application further comprises an audio-visual recorder whereby the student or the teacher records a lesson in real-time and has the ability to access the lesson at a later time.

14. The virtual music lesson system of claim 10, wherein the application further comprises a library of special effects including one or more of distortion, chorus, and reverb.

15. The virtual music lesson system of claim 10, wherein the audio inputs and outputs further comprise:
a music instrument input;
a voice input;
a speaker output;
a beat output; and
an opponent output.

16. The virtual music lesson system of claim 10, wherein the application further comprises a WEBRTC programming interface configured to be able to set up a peer-to-peer connection.

17. The virtual music lesson system of claim 10, wherein the instrument is a guitar, bass guitar, keyboard, or microphone.

18. The virtual music lesson system of claim 10, wherein the application, the student computer, and the teacher computer are connected via a network connection.

19. The virtual music lesson system of claim 18, wherein the network connection is configured to use UDP and/or TCP protocol and is encrypted using end to end encryption.

20. A virtual music lesson system, comprising:
a student computer associated with a student;
a teacher computer associated with a teacher, the teacher computer remote from the student computer;
an application in wireless communication with both the student computer and the teacher computer, having:
a plurality of audio drivers configured to receive instrumental and vocal audio inputs and outputs;
a low-latency audio mixer configured to mix the instrumental and vocal audio inputs and outputs;
a user interface having a student portal and a teacher portal, the student portal configured to communicate with the student computer, and the teacher portal configured to communicate with the teacher computer; and
at least one downloadable item,
wherein the student and the teacher at remote locations participate in an integrated music lesson by connecting an instrument to the student computer and the teacher computer;
wherein the teacher communicates with the student via the application; and
wherein the application is configured to permit the teacher, through the teacher computer, to transmit the at least one downloadable item to the student and, through the student computer, to download the at least one downloadable item in real time.

21. The virtual music lesson system of claim 20, wherein the at least one downloadable item comprises one or more chord charts, sheet music, and tablatures.

22. The virtual music lesson system of claim 21, wherein the at least one downloadable item can be accessed from the student computer offline.

23. The virtual music lesson system of claim 20, wherein the instrument is connected to the student computer and the teacher computer via an analog to USB cable directly into a USB port on the student computer and the teacher computer.

* * * * *